United States Patent [19]
Chen

[11] Patent Number: 5,682,251
[45] Date of Patent: Oct. 28, 1997

[54] BILEVEL IMAGE REDUCING AND ENLARGING METHODS AND APPARATUS

[75] Inventor: Li Ming Chen, Tokyo, Japan

[73] Assignee: Oki Data Corporation, Tokyo, Japan

[21] Appl. No.: 646,161

[22] Filed: May 7, 1996

[30] Foreign Application Priority Data

Jun. 7, 1995 [JP] Japan .................................... 7-164687

[51] Int. Cl.$^6$ ...................................................... H04N 7/12
[52] U.S. Cl. ........................................... 358/451; 358/456
[58] Field of Search .................................... 358/451, 528, 358/456–458, 534, 536, 459; 382/298; 348/240, 581

[56] References Cited

U.S. PATENT DOCUMENTS

| | | | |
|---|---|---|---|
| 4,266,249 | 5/1981 | Chai et al. | 358/260 |
| 5,317,417 | 5/1994 | Yamamura et al. | 358/451 |

Primary Examiner—Edward L. Coles, Sr.
Assistant Examiner—Stephen Brinich
Attorney, Agent, or Firm—Panitch Schwarze Jacobs & Nadel, P.C.

[57] ABSTRACT

A bilevel image is reduced by dividing the image into N×N blocks of pixels, counting black pixels in each block, decrementing the black-pixel count if a certain delayed output value represents a black pixel, and generating an output value by comparing the resulting count with a threshold value. A bilevel image is enlarged by expanding each white pixel into an N×N block of white pixels, and each black pixel into an N×N block of pixels containing a non-zero number of black pixels, this non-zero number being a non-decreasing function of the number of black pixels in certain positions adjacent to the black pixel being expanded. N is an arbitrary integer greater than one.

19 Claims, 13 Drawing Sheets

|   | 0 | 1 | 2 | 3 |
|---|---|---|---|---|
| 0 | 1 | 0 | 1 | 1 |
| 1 | 1 | 1 | 1 | 1 |
| 2 | 2 | 1 | 1 | 0 |
| 3 | 1 | 0 | 1 | 2 |

|   | 0 | 1 | 2 | 3 | 4 | 5 |
|---|---|---|---|---|---|---|
| 0 | 0 | 0 | 1 | 0 | 0 | 1 |
| 1 | 0 | 0 | 1 | 1 | 0 | 0 |
| 2 | 0 | 0 | 1 | 1 | 0 | 0 |
| 3 | 0 | 0 | 1 | 0 | 0 | 1 |

|   | 0 | 1 | 2 | 3 |
|---|---|---|---|---|
| 0 | 1 | 0 | 0 | 1 |
| 1 | 1 | 1 | 0 | 0 |
| 2 | 2 | 1 | 0 | -1 |
| 3 | 1 | 0 | 0 | 1 |

BILEVEL IMAGE REDUCING AND ENLARGING METHODS AND APPARATUS

BACKGROUND OF THE INVENTION

The present invention relates to methods and apparatus for reducing and enlarging bilevel images, especially images including bilevel representations of continuous-tone images.

Bilevel images consist of black and white dots or pixels, while continuous-tone images consist of pixels with various gray levels. Bilevel representations of continuous-tone images are obtained by the well-known dithering process, which represents different shades of gray by different densities of black and white pixels. This enables a continuous-tone image to be reproduced by a printer that prints only black or white dots.

Reduction and enlargement become necessary when the dot resolution of the original bilevel image does not match the dot resolution of the printer. When a bilevel image having four hundred dots per inch is printed by a printer that prints only two hundred dots per inch, for example, the number of dots in the image must be reduced by a factor of two both vertically and horizontally. Conversely, if the image has a resolution of two hundred dots per inch and the printer has a resolution of four hundred dots per inch, the image must be enlarged by doubling the number of dots both vertically and horizontally.

Reduction and enlargement may also be employed to speed up data transmission. An image to be printed at a resolution of six-hundred dots per inch, for example, might be reduced to a resolution of three hundred dots per inch for transmission to a printer, reducing the amount of transmitted data by a factor of four, then re-enlarged to six hundred dots per inch in the printer.

Reduction and enlargement can also be employed to save time when images are transferred between different computer systems, or to reduce the size of stored image data, or to change the physical size of a printed image.

A conventional method of reducing image resolution by a factor of two is to apply a majority-vote rule to two-by-two blocks of pixels. Blocks containing two black pixels or more are rendered as one black pixel each; blocks containing fewer than two black pixels are rendered as one white pixel each. A disadvantage of this method is that light gray areas, such as areas in which every two-by-two block of pixels contains just one black pixel, become completely white.

A conventional method of enlarging an image by a factor of two is to convert each black pixel to a two-by-two block of black pixels, and each white pixel to a two-by-two block of white pixels. A disadvantage of this method is that the shape of the blocks may become visible, so that an area that appeared smoothly gray in the original image looks like a white area dotted with small black squares in the enlarged image.

Both of these conventional methods extend in an obvious way to reduction and enlargement by factors greater than two, at which they exhibit the above disadvantages to an even greater degree. Shades of gray that were represented in an apparently continuous manner in the original image no longer look continuously gray after reduction or enlargement.

Other known methods of reducing and enlarging bilevel images tend to become computationally demanding, requiring extensive interpolation calculations, for example.

SUMMARY OF THE INVENTION

It is accordingly an object of the present invention to reduce a bilevel image representing a continuous-tone image in a way that continues to represent tones in a continuous manner.

Another object of the invention is to enlarge a bilevel image representing a continuous-tone image in a way that continues to represent tones in a continuous manner.

Still another object is to reduce a bilevel image by means of a small number of simple arithmetic and logic operations.

Yet another object is to enlarge a bilevel image by means of a small number of simple arithmetic and logic operations.

A further object is to reduce the amount of bilevel image data that must be transferred between a computer and either a peripheral device or another computer.

The invented method of reducing a bilevel image comprises the steps of:

dividing the bilevel image into mutually exclusive N×N blocks of pixels, where N is an arbitrary integer greater than one;

counting the black pixels in each block to obtain a first black-pixel count for each block;

decrementing the first black-pixel count when a certain delayed output value represents a black pixel;

comparing the resulting black-pixel count with a threshold value;

generating an output value representing a black pixel if the count exceeds the threshold value, or a white pixel if the count does not exceed the threshold value; and delaying the output value by a certain amount to produce the above-mentioned delayed output value, for use in generating another output value later.

The invented reducing apparatus comprises a black-pixel counting unit, a subtractor, a thresholding unit, and a delay unit for carrying out these steps.

The invented method of enlarging a bilevel image comprises the steps of:

generating from each white pixel in the bilevel image an N×N block of white output pixels, where N is an arbitrary integer greater than unity;

associating each black pixel in the bilevel image with a set of adjacent pixels (possibly including the black pixel itself);

counting black pixels in this set, thereby obtaining a second black-pixel count; and generating an N×N block of output pixels containing a non-zero number of black pixels, this non-zero number being a non-decreasing function of the second black-pixel count.

The invented enlarging apparatus comprises a black-pixel counting unit and an N×N pixel generating unit for carrying out these steps.

The invented reducing apparatus and enlarging apparatus can be combined to form a bilevel image reducing and enlarging system.

BRIEF DESCRIPTION OF THE DRAWINGS

FIG. 5 illustrates the calculation of black-pixel counts for reducing the image in FIG. 4.

FIG. 6 illustrates delayed output values obtained by reducing the image in FIG. 4.

FIG. 7 illustrates the result of subtracting the values in FIG. 6 from the counts in FIG. 5.

FIG. 8 shows the image in FIG. 4 as reduced using the results in FIG. 7.

DETAILED DESCRIPTION OF THE INVENTION

Embodiments of the invention will be described with reference to the attached illustrative drawings.

Figure 1:
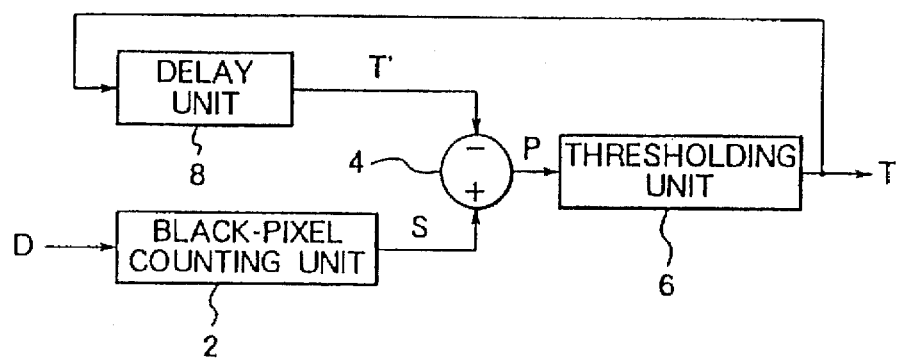
FIG. 1 is a block diagram of the invented bilevel image reducing apparatus.

FIG. 1 shows an embodiment of the invented reducing apparatus, comprising a black-pixel counting unit 2, a subtractor 4, a thresholding unit 6, and a delay unit 8.

The black-pixel counting unit 2 divides an input bilevel image D into mutually exclusive N×N blocks of pixels, each of which will be reduced to one output pixel. The black-pixel counting unit 2 counts the number of black pixels in each N×N block, and outputs a separate black-pixel count S for each block.

The black-pixel counting unit 2 scans the bilevel image one horizontal line of pixels at a time, scanning each horizontal line from left to right and taking the horizontal lines in order from top to bottom. The black-pixel counting unit 2 has, for example, a buffer for storing M/N count values, where M is the number of pixels per line. Each black input pixel increments a corresponding one of these count values. When N lines have been scanned, the count values represent the black-pixel counts of N×N blocks.

The subtractor 4 receives a delayed output value T' from the delay unit 8, and decrements the black-pixel count S by one if the delayed output value represents a black pixel. In the following description it will be assumed that a black pixel is represented by a binary one and a white pixel by a binary zero, so the subtractor 4 simply subtracts T' from S. The result is a processed pixel count P.

The thresholding unit 6 compares the processed pixel count P with a certain threshold value and generates an output value T. The output value T represents a black pixel (T=1) if the processed pixel count P exceeds the threshold value, and represents a white pixel (T=0) if the processed pixel count P does not exceed the threshold value. The threshold value in the present embodiment is zero. The output values T constitute the reduced output image.

The delay unit 8 receives each output value T, stores the value of T temporarily, and outputs the value of T at a certain later time as the delayed output value T'. In the present embodiment the output value T is delayed by N output pixels (i.e. by N output periods), so that when a certain output pixel value is being calculated, the black-pixel counting unit 2 receives the output value of the pixel N positions to the left in the same horizontal line. For the first N pixels in each horizontal line, since there is no pixel N positions to the left, the delay unit 8 generates a fixed delayed output value of zero.

Figure 2:
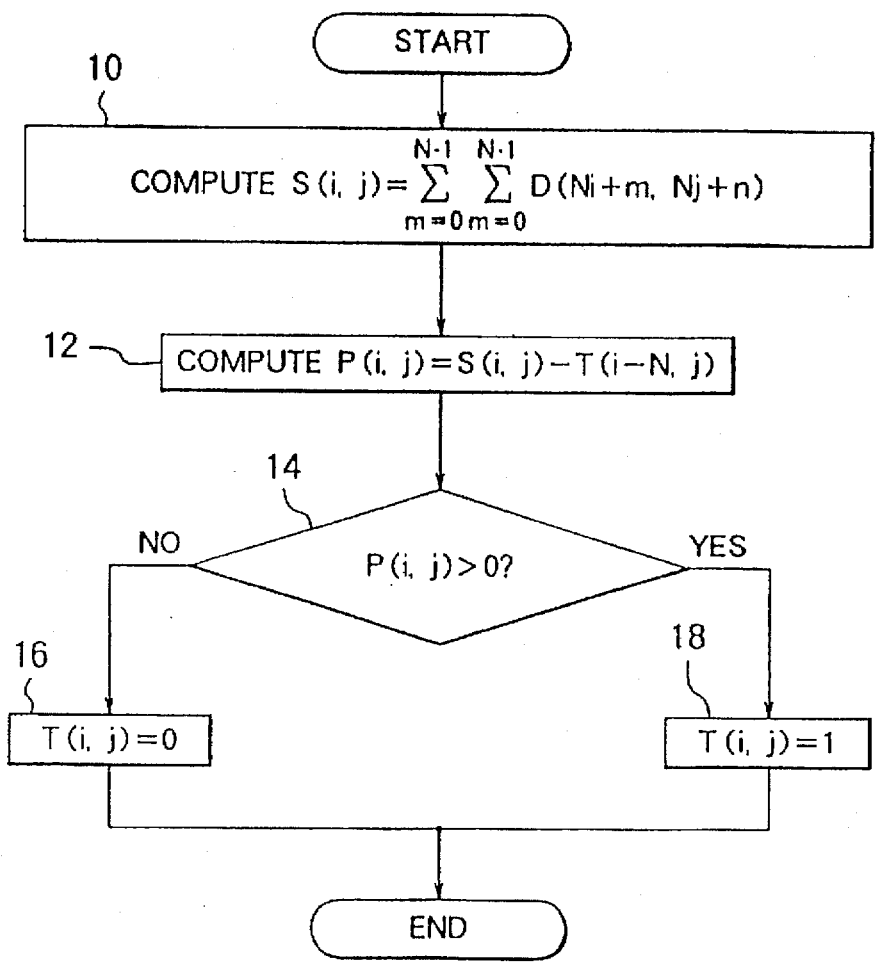
FIG. 2 is a flowchart describing the operation of the apparatus in FIG. 1.

FIG. 2 illustrates the operation of the embodiment in FIG. 1 in flowchart form.

Pixel positions in the input and output images D and T will be represented by non-negative integer coordinates (i, j). FIG. 2 illustrates the calculation of one output value T(i, j). The black-pixel count S(i, ), processed pixel count P(i, j), and output value T(i, j) are obtained from an N×N block of input pixels D(Ni+m, Nj+n), where m and n are integers that both range from zero to N–1.

In the first step 10 in FIG. 2, the black-pixel count S(i, j) is computed by adding the values of the input pixels in this block.

In the second step 12, the processed pixel count P(i, j) is computed by subtracting T(i–N, j) from S(i, j). T(i–N, j) is the output value of the pixel N positions to the left of T(i, j). If i is less than N, making i–N negative, then T(i–N, j) is zero.

In the third step 14, P(i, j) is compared with the threshold value zero. If P(i, j) is equal to or less than zero, then T(i, j) is set equal to zero in step 16. If P(i, j) is greater than zero, then T(i, j) is set equal to one in step 18. This completes the calculation of T(i, j).

As can be seen from FIG. 2, the invented reducing method requires only a small number of very simple arithmetic and logic operations.

Figure 3:
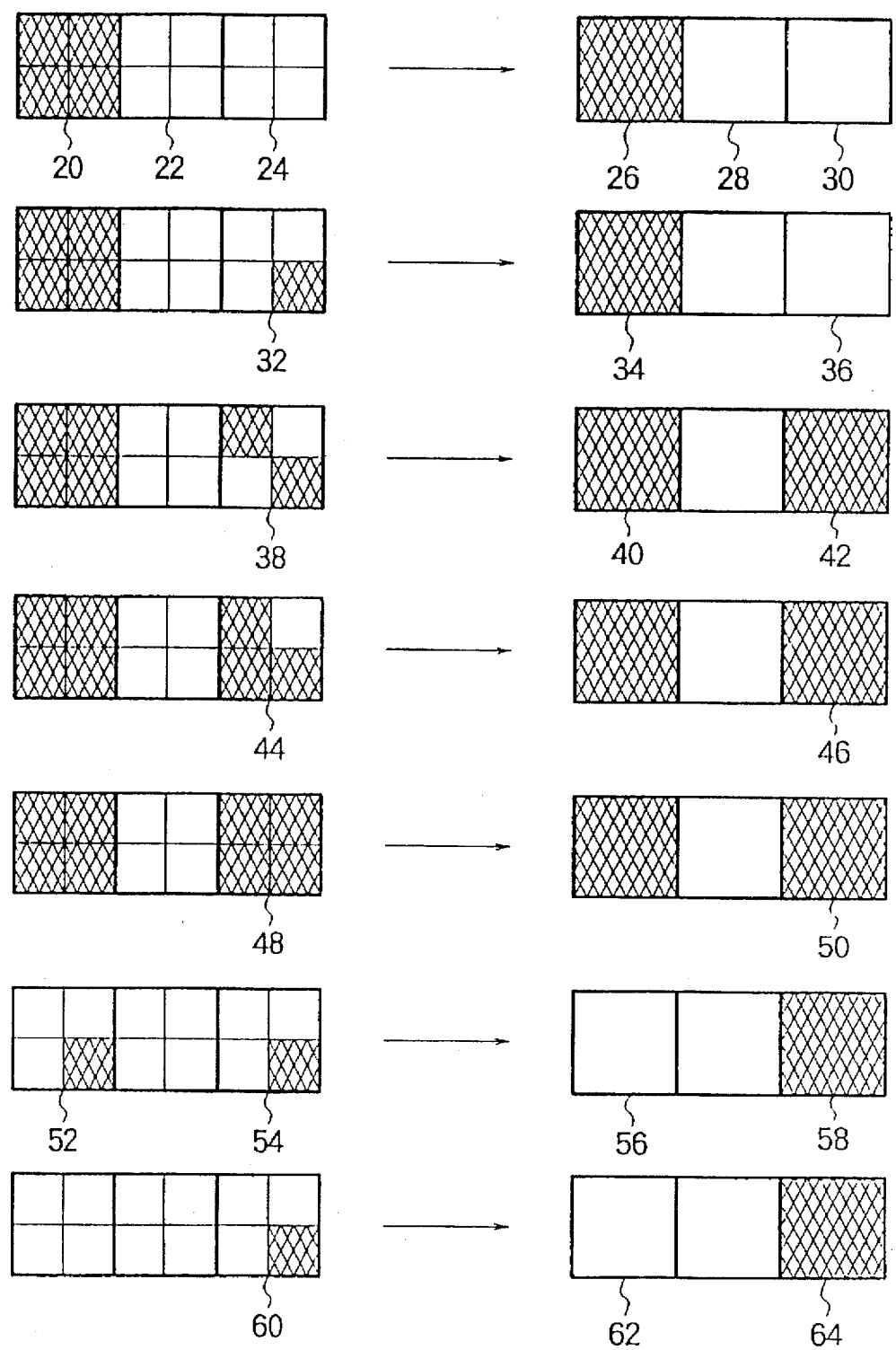
FIG. 3 illustrates this operation for various blocks of pixels.

FIG. 3 illustrates the above process when N is equal to two, showing groups of input pixels on the left and corresponding groups of output pixels on the right.

Three consecutive two-by-two blocks 20, 22, and 24 of input pixels are shown at the upper left. The black-pixel count S of block 20 is four, so its processed pixel count P is three or four, and a black pixel 26 is output. The black-pixel counts of blocks 22 and 24 are zero, so their processed pixel counts are zero or minus one, and white pixels 28 and 30 are output.

In the next row, block 32 has a black-pixel count of one, from which the value of pixel 34 is subtracted to give a processed pixel count of zero. Output pixel 36 is accordingly white.

Block 38 has a black-pixel count of two, from which the value of pixel 40 is subtracted to give a processed pixel count of one. Output pixel 42 is accordingly black.

Similarly, block 44 has a black-pixel count of three and a processed pixel count of two, yielding a black output pixel 46, and block 48 has a black-pixel count of four and a processed pixel count of three, yielding a black output pixel 50.

Blocks 52 and 54 both have black-pixel counts of one. If block 52, like block 32, yielded a white output pixel 56, then block 54 has a processed pixel count of one and yields a black output pixel 58. Conversely, if block 52 had yielded a black pixel, then block 54 would yield a white pixel. This shows that even light shades of gray, which would become all white under the majority-vote rule, are reproduced as gray by the invented reducing method.

Block 60 also has a black-pixel count of one, from which the zero value of pixel 62 is subtracted to yield a processed pixel count of one and a black output pixel 64. This shows that isolated black dots are not lost in the invented reducing method, but produce black output dots.

Figure 4:
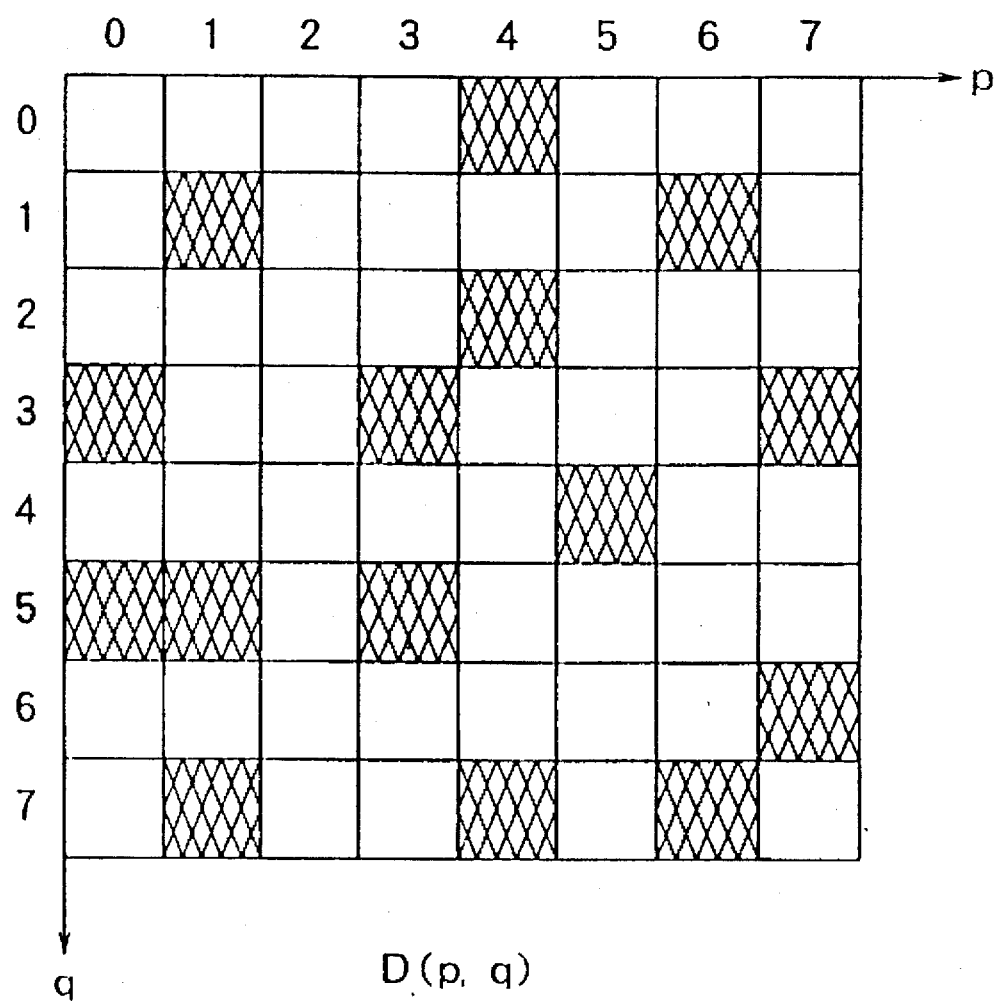
FIG. 4 shows part of a bilevel image, representing a shade of gray.

FIGS. 4 to 8 further illustrate the invented reducing process when N equals two. FIG. 4 shows a typical bilevel representation of a shade of gray. Horizontal coordinates from zero to seven are represented by the letter p, and vertical coordinates from zero to seven by the letter q. FIG. 5 shows the black-pixel counts $S(i, j)$ for horizontal coordinates i from zero to three and vertical coordinates j from zero to three. The coordinates in FIGS. 4 and 5 are related by the formulas $i=p/2$ and $j=q/2$, disregarding fractions. FIG. 6 shows the delayed output values $T'(i, j)$ or $T(i-2, j)$ for horizontal coordinates i from zero to five and vertical coordinates j from zero to three. FIG. 7 shows the output values $T(i, j)$ for horizontal coordinates i from zero to three and vertical coordinates j from zero to three. FIG. 8 shows the output image, illustrating the tendency of the invented method to convert an input shade of gray to a darker output shade of gray.

Figure 9:
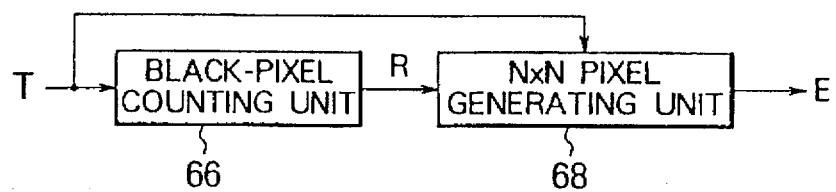
FIG. 9 is a block diagram of the invented bilevel image enlarging apparatus.

FIG. 9 shows an embodiment of the invented enlarging apparatus, comprising a black-pixel counting unit 66 and an N×N pixel generating unit 68.

The black-pixel counting unit 66 receives an input image T and operates on two-by-two blocks like the black-pixel counting unit 2 in FIG. 1, counting the number of black pixels in each block. These two-by-two blocks are not mutually exclusive. A separate block is associated with each input pixel, consisting of the pixel itself, the adjacent pixels above and to the left, and the pixel diagonally adjacent to the upper left. The black pixel counts produced for these blocks by the black-pixel counting unit 66 will be denoted by the letter R.

The N×N pixel generating unit 68 receives the input pixels T and their associated black-pixel counts R. For each white input pixel T, the N×N pixel generating unit 68 generates an N×N block of white output pixels. For each black input pixel T, the N×N pixel generating unit 68 generates an N×N block of output pixels containing a non-zero number of black pixels that depends in a non-decreasing manner on the black-pixel count R. That is, the number of pixels in the output N×N block is at least one, and as R increases, the number of output black pixels may increase or stay the same, but cannot decrease. The N×N blocks output by the N×N pixel generating unit 68 form the enlarged output image E.

Figure 10:
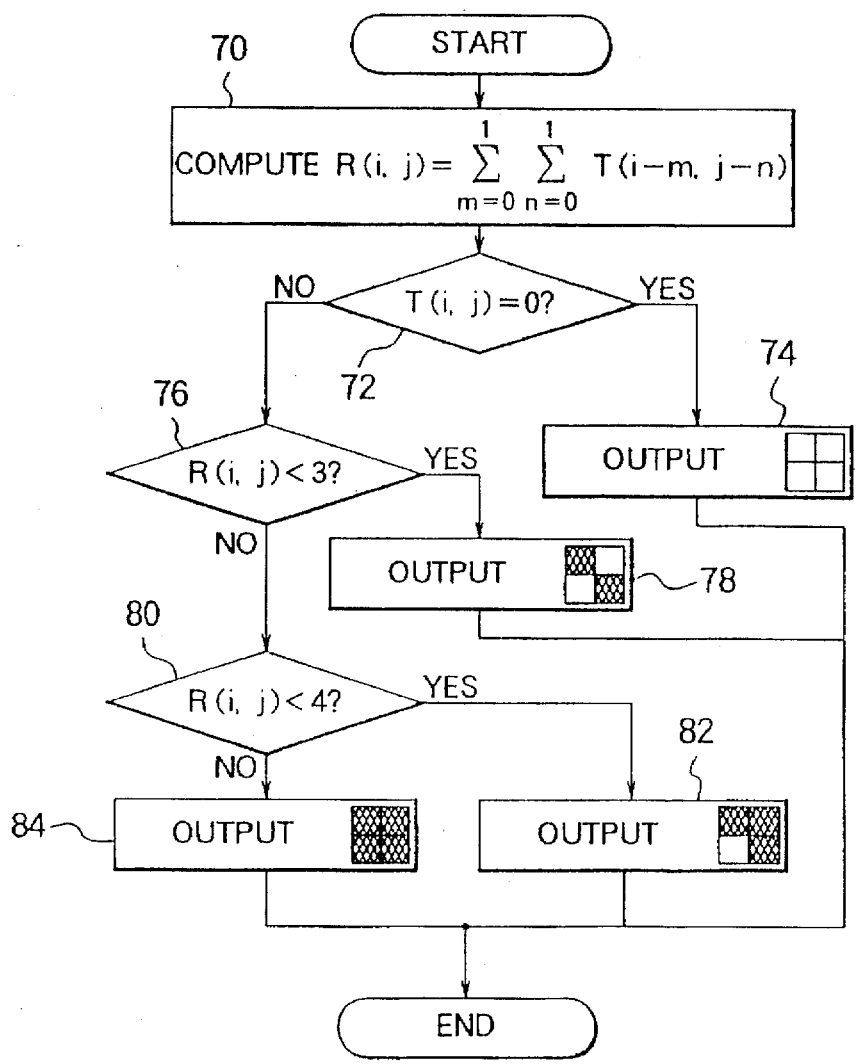
FIG. 10 is a flowchart describing the operation of the apparatus in FIG. 9.
Figure 11A:
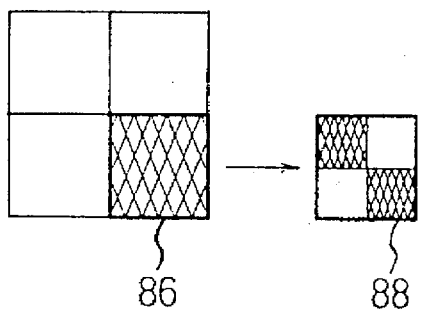
FIGS. 11(a)–11(b) illustrate this operation for various pixels.
Figure 11B:
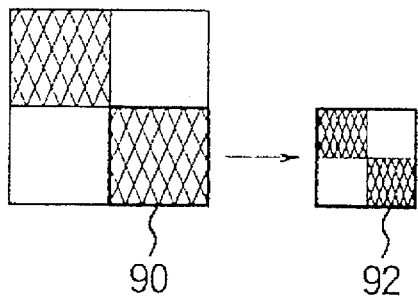
Figure 11C:
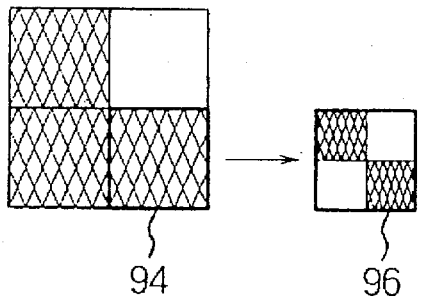
Figure 11D:
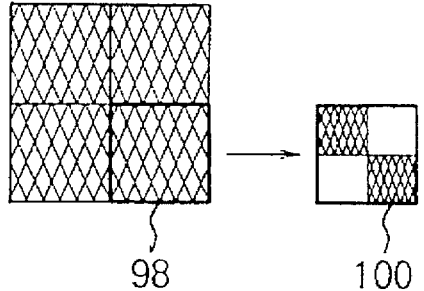
Figure 11E:
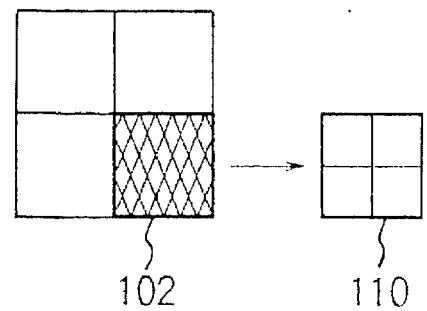
Figure 11F:
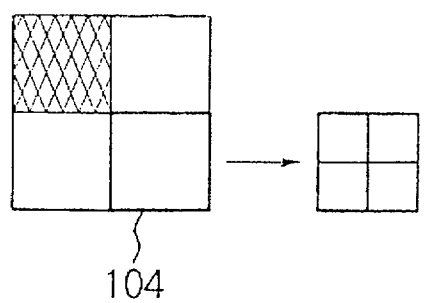
Figure 11G:
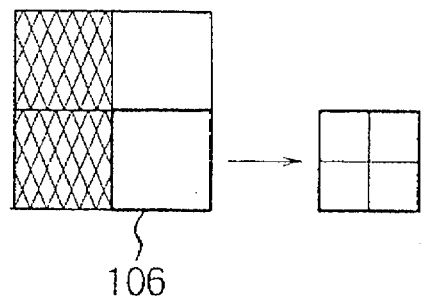
Figure 11H:
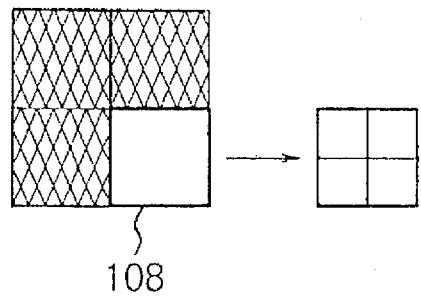

The flowchart in FIG. 10 shows an example of the operation of the invented enlarging apparatus when N is two. Pixels in the input image are denoted $T(i, j)$, where $(i, j)$ represents horizontal and vertical coordinates as before.

In the first step 70, the black-pixel counting unit 66 computes the black-pixel count $R(i, j)$ of the two-by-two block containing $T(i, j)$ and its upper, left, and upper-left adjacent pixels.

In the next step 72, $T(i, j)$ is compared with zero. If $T(i, j)$ is zero, representing white, a block of four white pixels is output in step 74.

If $T(i, j)$ is one, representing black, then in step 78 $R(i, j)$ is compared with three. If $R(i, j)$ is less than three, a block having two black pixels is output in step 78.

If $R(i, j)$ is not less than three, then in step 80 $R(i, j)$ is compared with four. If $R(i, j)$ is less than four, a block having three black pixels is output in step 82. If $R(i, j)$ is equal to four, a block of four black pixels is output in step 84.

Table 1 lists the number of black pixels output for each black-pixel count $R(i, j)$ when $T(i, j)$ is one, showing that this number is a non-decreasing function of $R(i, j)$.

TABLE 1

| Number of Black Pixels Output When $T(i, j) = 1$ | |
|---|---|
| $R(i, j)$ | Number of black output pixels |
| 1 | 2 |
| 2 | 2 |
| 3 | 3 |
| 4 | 4 |

FIGS. 11(a)–11(h) illustrate the process in FIG. 10 graphically. Black input pixel 86, with three adjacent white pixels, yields an output block 88 having two black output pixels. Black input pixel 90, with one adjacent black pixel, also yields an output block 92 having two black output pixels. Black input pixel 94, with two adjacent black pixels, yields an output block 96 having three black pixels. Black input pixel 98, with three adjacent black pixels, yields an output block 100 having four black pixels. Regardless of the number of adjacent black pixels, white input pixels 102, 104, 106, and 108 all yield a block of four white output pixels, e.g. block 110.

Figure 12:
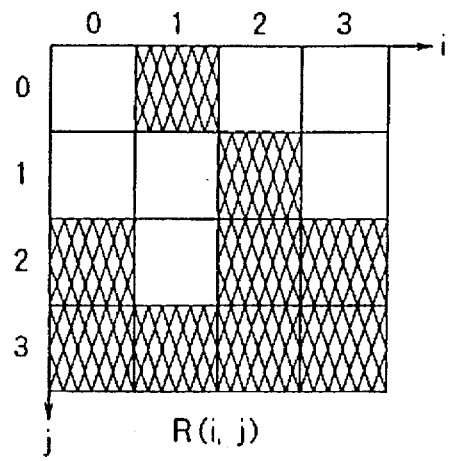
FIG. 12 shows part of a bilevel image.
Figure 13:
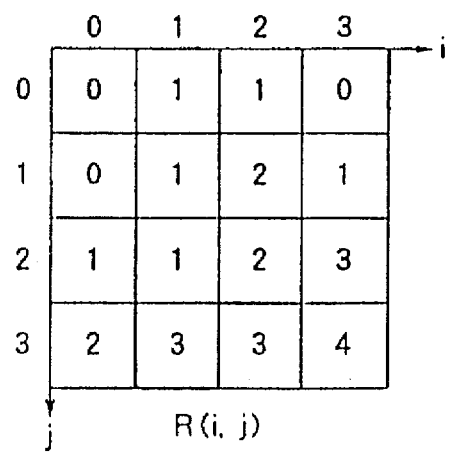
FIG. 13 illustrates the calculation of black-pixel counts for enlarging the image in FIG. 12.
Figure 14:
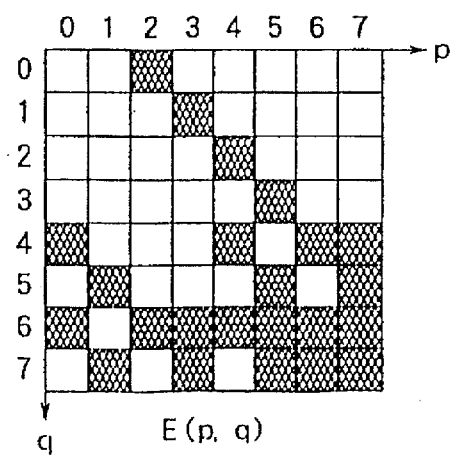
FIG. 14 shows the result of enlarging the image in FIG. 12, using the count data in FIG. 13.

FIGS. 12 to 14 illustrate the expansion of a four-pixel-by-four-pixel bilevel image area to eight-by-eight resolution by the invented enlarging method. FIG. 12 shows the top left corner of an input bilevel image T, the letters i and j representing horizontal and vertical coordinates. FIG. 13 shows the black-pixel counts obtained by the black-pixel counting unit 66. Non-existent pixels above the top edge or to the left of the left edge are counted as white. FIG. 14 shows the output image E, the letters p and q representing horizontal and vertical coordinates. As these figures show, the output bilevel image tends to have a lower density of black pixels than the input image. This enables an overly "blocky" appearance to be avoided.

The enlarging method illustrated in these figures can be described by the following arithmetic and logic formulas.

$E(2i, 2j)=T(i, j)$ $E(2i, 2j+1)=T(i, j)$ AND $[R(i, j)>3]$ $E(2i+1, 2j)=T(i, j)$ AND $[R(i, j)>2]$ $E(2i+1, 2j+1)=T(i, j)$

In these formulas, AND represents the logical AND operation. $[R(i, j)>3]$ is a Boolean quantity having the value one when $R(i, j)$ is greater than three, and the value zero when $R(i, j)$ is three or less. Similarly, $[R(i, j)>2]$ has the value one when $R(i, j)$ is greater than two, and the value zero when $R(i, j)$ is two or less. These formulas demonstrate that the invented enlarging method requires only simple arithmetic and logic operations.

Figure 15:
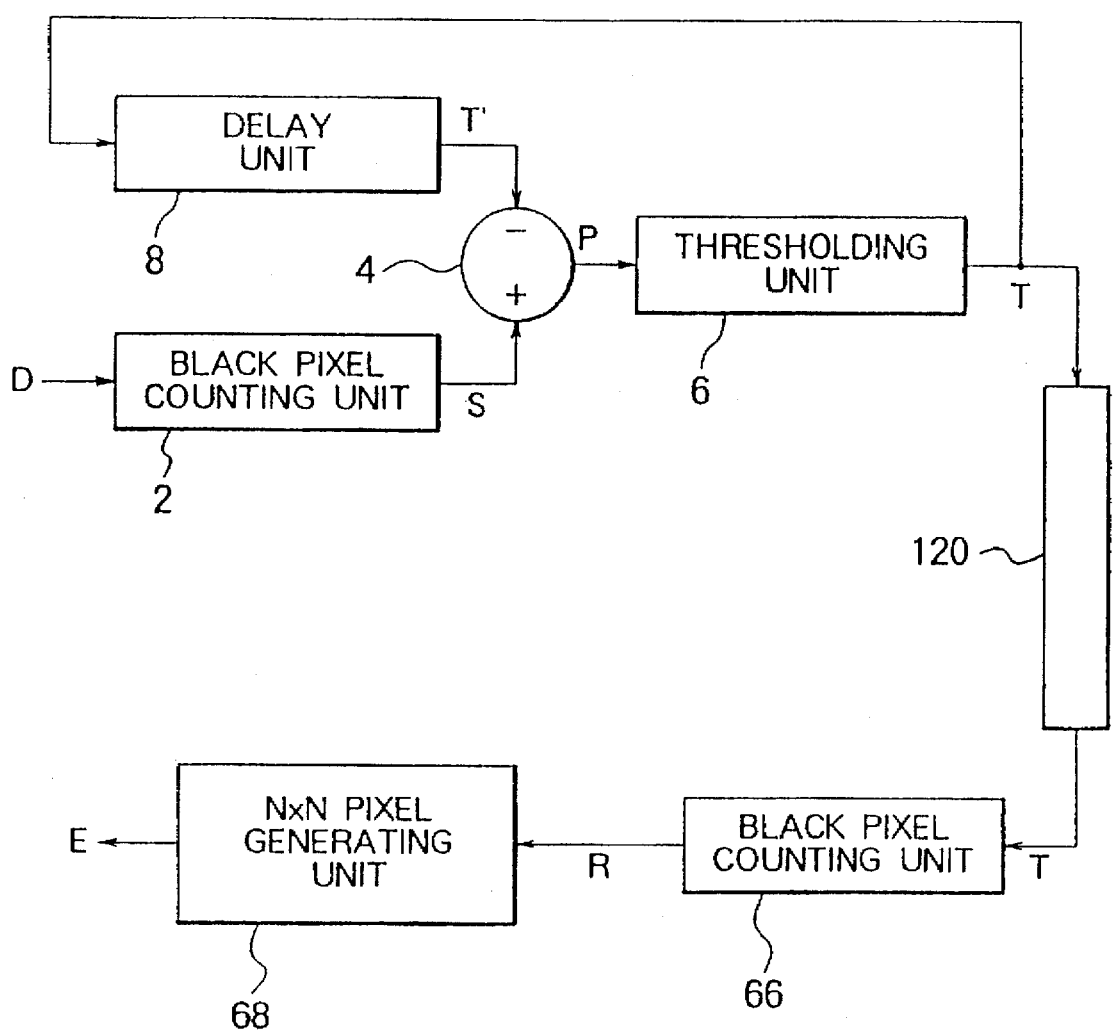
FIG. 15 illustrates the invented bilevel image reducing and expanding system.

FIG. 15 shows a novel bilevel image reducing and enlarging system, using the same reference numerals as in FIGS. 1 and 9 to denote identical elements. In this system, the reducing apparatus of FIG. 1 is linked to the enlarging apparatus of FIG. 9 by a communication channel 120. The reduced image T output by the thresholding unit 6 in the reducing apparatus is transmitted via the communication channel 120 and becomes the image T input to the black-pixel counting unit 66 in the enlarging apparatus.

The operation of the system in FIG. 15 can be understood from the preceding description. The original input image D and final output image E have the same size, although not, in general, exactly the same content. The image T transmitted over the communication channel 120 is smaller than images D and E by a factor of 1/(N×N). The transmission is speeded up accordingly.

The communication channel 120 can be, for example, a cable connecting a computer to a printer, the reducing apparatus being located in the computer and the enlarging apparatus in the printer. The communication channel 120 can also be a cable connecting a computer to a scanner, the reducing apparatus being located in the scanner and the enlarging apparatus in the computer. Alternatively, the communication channel 120 can be a network link between two computers at different sites, or an optical data link, a wireless radio link, or any other type of data link.

The invented reducing and enlarging system may be connected to a data storage device instead of to a communication channel, enabling images to be stored at a reduced size, then reproduced at their original size.

FIGS. 16 to 20 illustrate the operation of the invented reducing and enlargement methods on a bilevel test image, and compare the results with results obtained by prior-art methods.

Figure 16:
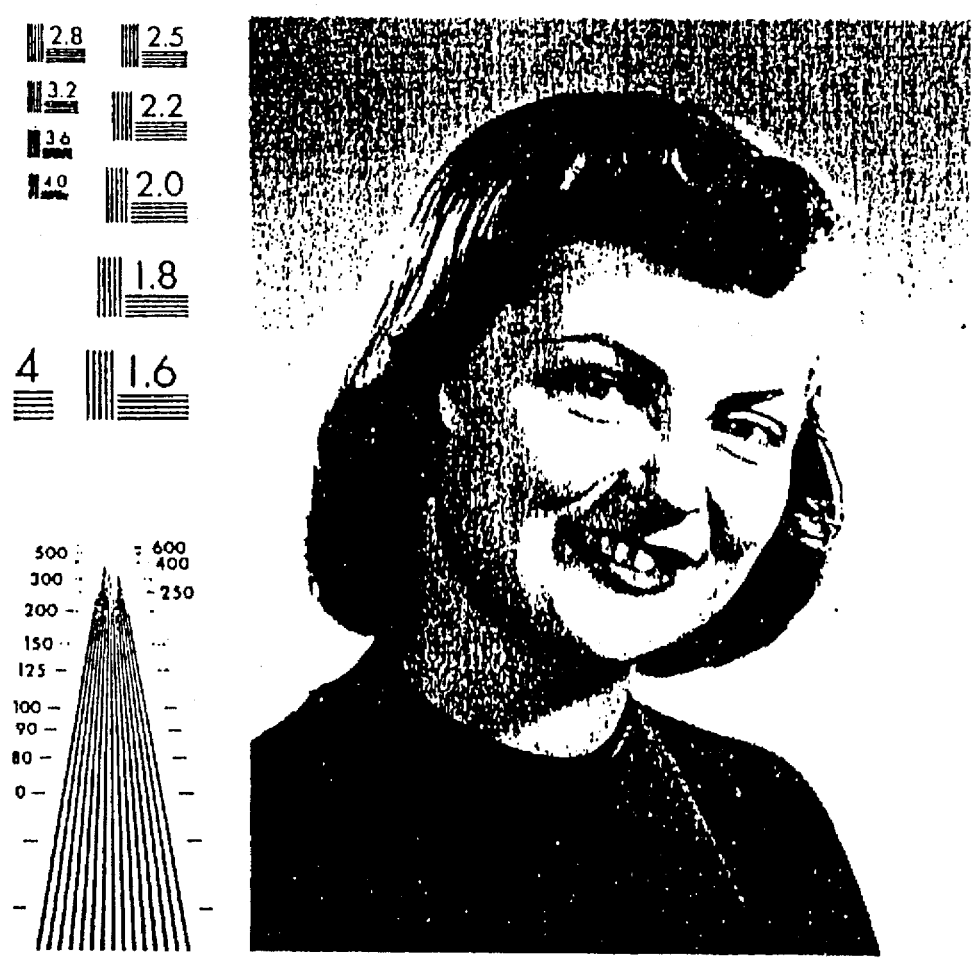
FIG. 16 illustrates a bilevel representation of a continuous-tone image.

FIG. 16 shows the test image, comprising test patterns and a bilevel representation of a portrait photograph. The original resolution was six hundred dots per inch. Shades of gray are represented by varying densities of black and white dots, giving the impression of a continuous range of tones from black to white.

Figure 17:
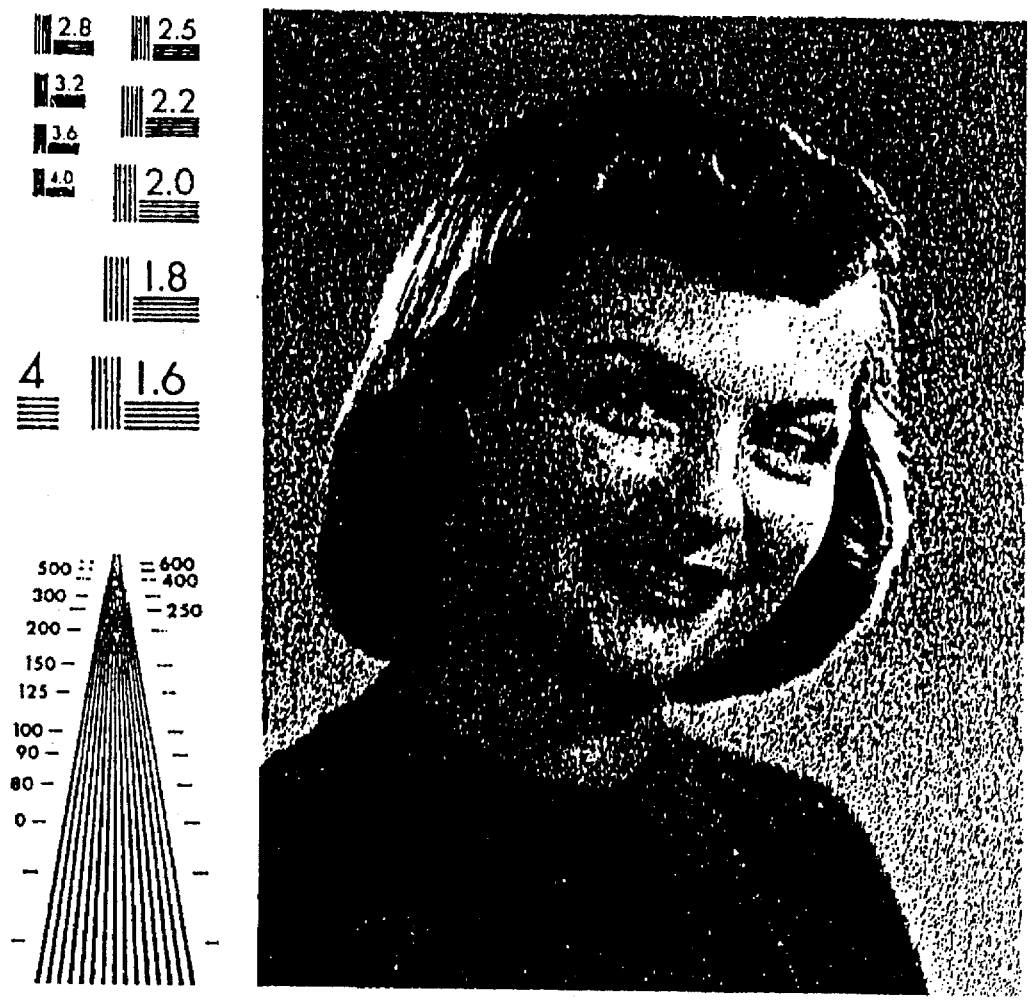
FIG. 17 shows the image in FIG. 16 reduced vertically and horizontally by a factor of two, by the invented method.

FIG. 17 shows the same image with its resolution reduced by a factor of two horizontally and vertically, using the invented reducing method. Although the image is darkened, the impression of a continuous range of tones is not lost. The image appears softened, as if viewed at a reduced ambient light level.

Figure 18:
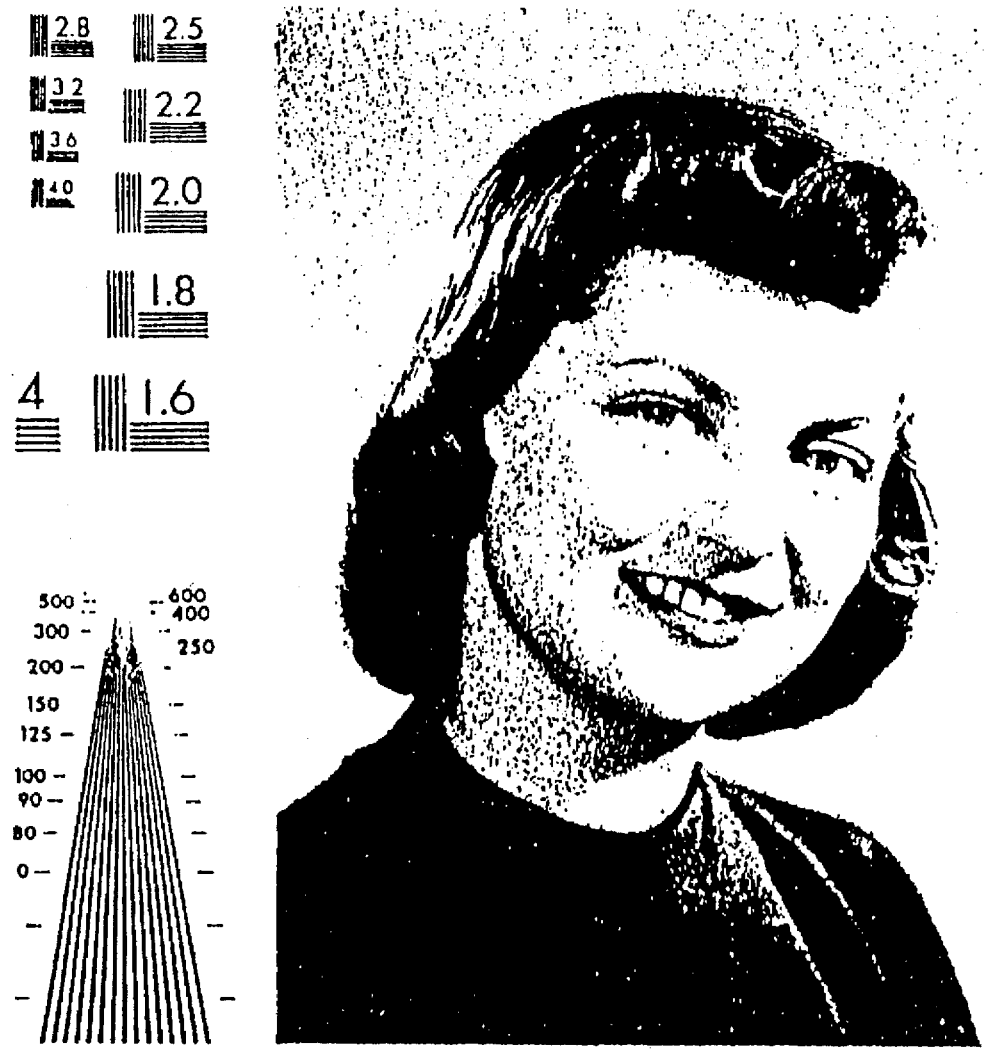
FIG. 18 shows the image in FIG. 16 similarly reduced by the majority-vote rule.

FIG. 18 shows the same image reduced by the same factor by the majority-vote method. The image now resembles an overexposed photograph, the woman's face having a washed-out appearance. The inability of the majority-vote method to reproduce gray tones continuously would be even more obvious at higher reduction ratios.

Figure 19:
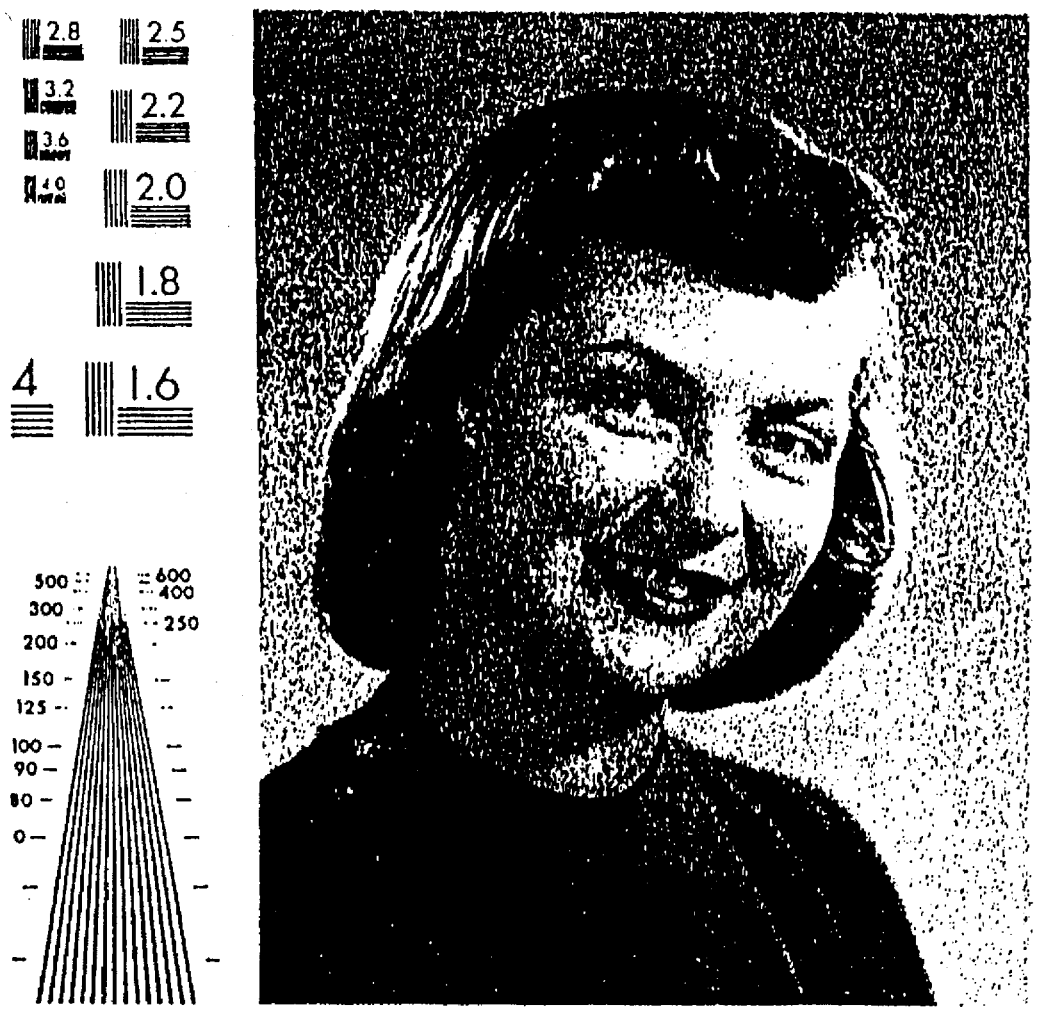
FIG. 19 shows the image in FIG. 16 first reduced, then enlarged, by the invented methods.

FIG. 19 shows the same image after reduction by a factor of two, followed by enlargement by a factor of two, vertically and horizontally, using the invented methods. Between the reduction and enlargement processes, the amount of data is reduced by a factor of four, permitting efficient storage or transmission of the image. The graininess of the re-enlarged image is considered unavoidable when the data content of a continuous-tone image is compressed by a factor as large as four by simple computational methods. Despite the graininess and a certain overall darkening, the re-enlarged image succeeds in reproducing shades of gray in an apparently continuous manner.

Figure 20:
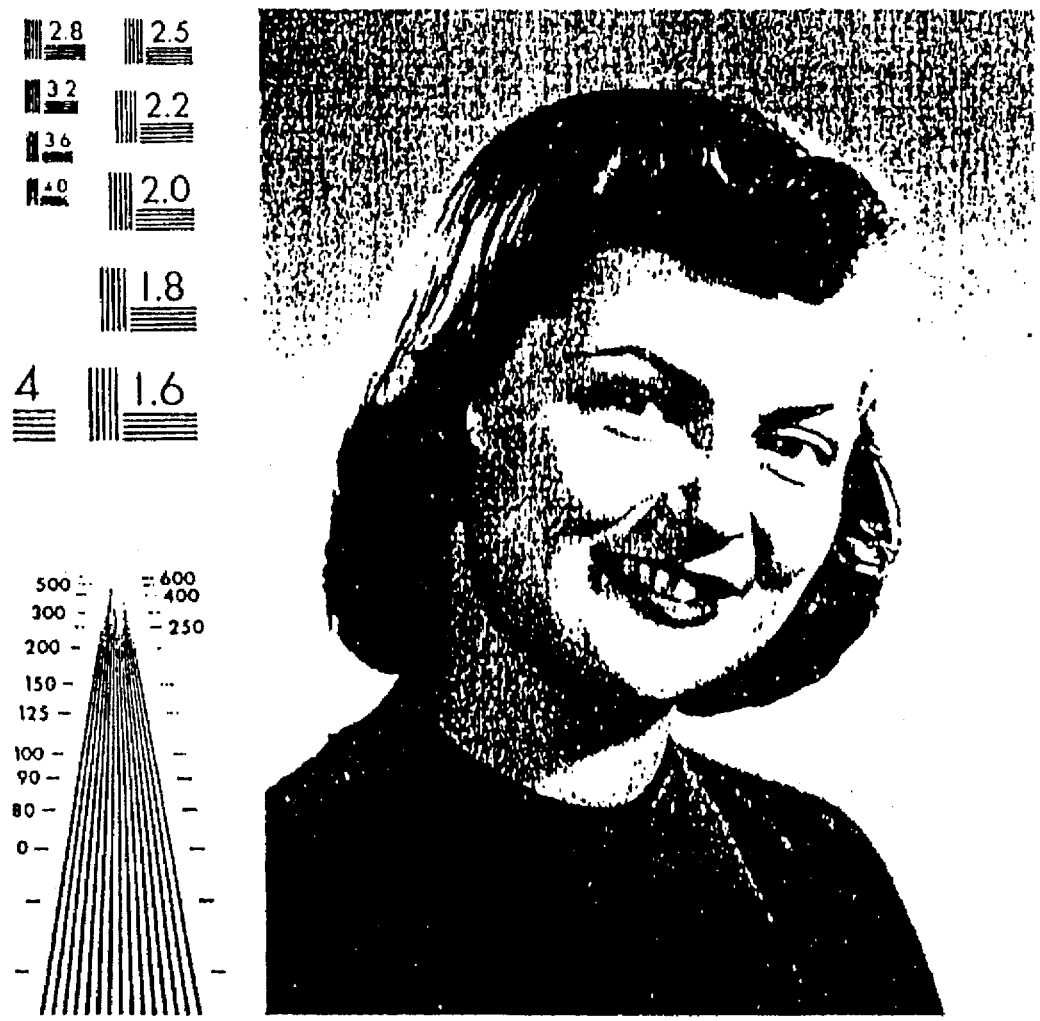
FIG. 20 shows the image in FIG. 16 first reduced, then enlarged, by a conventional method.

For comparison, FIG. 20 shows the same image after encoding and decoding by the widely-used modified modified read (MMR) method, which detects runs of black or white dots. Because of the lack of long runs in natural images of this type, the MMR method achieves only a slight reduction: the coded image (not visible) contains about 0.7 times as much data as the original image. Although the decoded image (FIG. 20) is identical to the original image, 0.7 is much less of a data reduction than the 0.25 achieved by the invented method in FIG. 19.

As these figures illustrate, using only simple arithmetic and logic operations, the invented methods achieve quite useful levels of performance, both for reducing or enlarging an image to convert from one dot resolution to another, and for reducing and then enlarging an image for the purpose of data compression.

The invention is not limited to the embodiments shown in the drawings. Some possible variations follow.

Instead of scanning the input bilevel image in horizontal lines of pixels, the black-pixel counting unit 2 can read each N×N block of pixel values from a memory device in which the bilevel image is stored before proceeding to the next N×N block.

The delay unit 8 can delay the output values by amounts other than N output pixels, such as by one output pixel or two output pixels. It is also possible to provide a plurality of delay units, and subtract the values of a plurality of output pixels with different delays from the black-pixel counts.

Instead of counting black pixels in a two-by-two block, the black-pixel counting unit 66 in the enlarging apparatus can count pixels in an arbitrary set of pixels adjacent to the pixel currently being processed. This associated set need not include the pixel currently being processed.

The step of counting black pixels adjacent to the pixel currently being processed by the enlarging apparatus can be skipped when the pixel currently being processed is white.

When N is two, the N×N pixel generating unit 68 is not restricted to the particular patterns of output pixels illustrated in FIGS. 10 and 11. Many variations are possible.

When an image is reduced, then enlarged, it is not necessary to use the invented methods for both reduction and enlargement. An image reduced by the invented method can be enlarged by another method, or an image reduced by another method can be enlarged by the invented method.

The invented methods can be implemented either in hardware or in software.

Those skilled in the art will recognize that still further variations are possible within the scope claimed below.

What is claimed is:

1. A reducing apparatus for reducing a bilevel image consisting of black and white pixels by a factor of N vertically and horizontally, where N is an arbitrary integer greater than unity, comprising:

a black-pixel counting unit for dividing said bilevel image into mutually exclusive N×N blocks of pixels and counting black pixels in each of said mutually exclusive N×N blocks, thereby obtaining a black-pixel count for each block among said mutually exclusive N×N blocks;

a subtractor coupled to said black-pixel counting unit, for receiving a delayed output value and decrementing said black-pixel count responsive to said delayed output value, thereby obtaining a processed pixel count;

a thresholding unit coupled to said subtractor, for comparing said processed pixel count with a threshold value, generating an output value representing a black pixel if said processed pixel count exceeds said threshold value, and generating an output value representing a white pixel if said processed pixel count does not exceed said threshold value; and a delay unit coupled to said thresholding unit, for receiving the output value generated by said thresholding unit, delaying said output value by a certain amount, and supplying the output value thus delayed to said subtractor as said delayed output value.

2. The reducing apparatus of claim 1, wherein said processed pixel count is equal to said black-pixel count when said delayed output value represents a white pixel, and is one less than said black-pixel count when said delayed output value represents a black pixel.

3. The reducing apparatus of claim 2, wherein said threshold value is zero.

4. The reducing apparatus of claim 1, wherein said delay unit delays each output value by an amount equivalent to N output periods, so that each output value generated by said thresholding unit is supplied to said subtractor in time for generating another output value N output periods later.

5. The reducing apparatus of claim 1, wherein said delay unit delays each output value by an amount equivalent to two output periods, so that each output value generated by said thresholding unit is supplied to said subtractor in time for generating another output value two output periods later.

6. An enlarging apparatus for enlarging a bilevel image consisting of black and white pixels by a factor of N vertically and horizontally, where N is an arbitrary integer greater than unity, comprising:

a black-pixel counting unit for associating each pixel in said bilevel image with a set of pixels including a certain number of pixels adjacent to said pixel, and counting black pixels in said set, thereby obtaining a black-pixel count; and an N×N pixel generating unit coupled to said black-pixel counting unit, for generating from each white pixel in said bilevel image an N×N block of white output pixels, and generating from each black pixel in said bilevel image an N×N block of output pixels containing a non-zero number of black pixels, said non-zero number being a non-decreasing function of said black-pixel count.

7. The enlarging apparatus of claim 6, wherein said set of pixels also includes the pixel with which said set of pixels is associated.

8. The enlarging apparatus of claim 7, wherein said set of pixels is a two-by-two block of pixels.

9. The enlarging apparatus of claim 8, wherein:

N is two;

said non-zero number is four when said black-pixel count is four;

said non-zero number is three when said black-pixel count is three; and said non-zero number is two when said black-pixel count is less than three.

10. A method of reducing and enlarging a bilevel image consisting of black and white pixels by a factor of N vertically and horizontally, where N is an arbitrary integer greater than unity, comprising the steps of:

dividing said bilevel image into mutually exclusive N×N blocks of pixels;

counting black pixels in each of said mutually exclusive N×N blocks, thereby obtaining a first black-pixel count for each block among said mutually exclusive N×N blocks;

decrementing said first black-pixel count responsive to a delayed output value, thereby obtaining a processed pixel count;

comparing said processed pixel count with a threshold value;

generating an output value representing a black pixel if said processed pixel count exceeds said threshold value;

generating an output value representing a white pixel if said processed pixel count does not exceed said threshold value;

delaying said output value by a certain amount to produce said delayed output value, for use in decrementing a later first black-pixel count;

repeating said steps of counting, decrementing, comparing, generating, and delaying for all of said mutually exclusive N×N blocks, thereby creating a reduced bilevel image consisting of black and white pixels;

generating from each white pixel in said reduced bilevel image an N×N block of white output pixels;

associating each black pixel in said reduced bilevel image with a set of pixels including a certain number of pixels adjacent to said black pixel, and counting black pixels in said set, thereby obtaining a second black-pixel count; and generating from each black pixel in said bilevel image an N×N block of output pixels containing a non-zero number of black pixels, said non-zero number being a non-decreasing function of said second black-pixel count.

11. The method of claim 10, wherein said processed pixel count is equal to said first black-pixel count when said delayed output value represents a white pixel, and is one less than said first black-pixel count when said delayed output value represents a black pixel.

12. The method of claim 11, wherein said threshold value is zero.

13. The method of claim 10, wherein said step of delaying comprises delaying each output value by an amount equivalent to N output periods, so that each output value is used in said step of decrementing to generate another output value N output periods later.

14. The method of claim 10, wherein said step of delaying comprises delaying each output value by an amount equivalent to two output periods, so that each output value is used in said step of decrementing to generate another output value two output periods later.

15. The method of claim 10, wherein black pixels are represented by binary one, white pixels are represented by binary zero, and said step of decrementing comprises subtracting said delayed output value from said first black-pixel count.

16. The method of claim 10, comprising the additional step of transmitting said reduced bilevel image through a communication channel.

17. The method of claim 10, wherein said set of pixels in said step of associating also includes the pixel with which said set of pixels is associated.

18. The enlarging apparatus of claim 17, wherein said set of pixels is a two-by-two block of pixels.

19. The enlarging apparatus of claim 18, wherein:

N is two;

said non-zero number is four when said second black-pixel count is four;

said non-zero number is three when said second black-pixel count is three; and said non-zero number is two when said second black-pixel count is less than three.

* * * * *